US011974120B2

(12) United States Patent
Mc Daid et al.

(10) Patent No.: US 11,974,120 B2
(45) Date of Patent: Apr. 30, 2024

(54) SYSTEM AND METHOD FOR SECURING A COMMUNICATION NETWORK

(71) Applicant: Adaptive Mobile Security Limited, Dublin (IE)

(72) Inventors: Cathal Mc Daid, Dublin (IE); Silke Holtmanns, Dublin (IE)

(73) Assignee: ADAPTIVE MOBILE SECURITY LIMITED, Dublin (IE)

( * ) Notice: Subject to any disclaimer, the term of this patent is extended or adjusted under 35 U.S.C. 154(b) by 0 days.

(21) Appl. No.: 17/589,564

(22) Filed: Jan. 31, 2022

(65) Prior Publication Data

US 2022/0248220 A1   Aug. 4, 2022

(30) Foreign Application Priority Data

Jan. 29, 2021 (EP) .................................... 21154426

(51) Int. Cl.
*H04W 12/122* (2021.01)
*H04L 9/40* (2022.01)
*H04W 12/037* (2021.01)

(52) U.S. Cl.
CPC ....... *H04W 12/037* (2021.01); *H04L 63/0209* (2013.01)

(58) Field of Classification Search
CPC ............. H04W 12/037; H04W 12/088; H04W 12/122; H04L 63/0209; H04L 63/0227; H04L 63/1441
See application file for complete search history.

(56) References Cited

U.S. PATENT DOCUMENTS 10,462,653 B1 * 10/2019 Verma ................. H04W 12/088
11,321,464 B2 * 5/2022 Govardhan ........... G06F 21/566
(Continued)

FOREIGN PATENT DOCUMENTS

WO   WO-2019197883 A1 * 10/2019 ........... H04L 63/108
WO   2020068521 A1    4/2020

OTHER PUBLICATIONS

EP21154426.7. Search Report (dated Jul. 22, 2021).
(Continued)

*Primary Examiner* — Lynn D Feild
*Assistant Examiner* — Abdullah Almamun
(74) *Attorney, Agent, or Firm* — Anthony G. Smyth; LOZA & LOZA, LLP

(57) ABSTRACT

A system for securing control plane traffic in a sliced communication network that is adapted to run a plurality of network functions includes a plurality of security guards, each placed at an edge of an internal security zone, wherein the internal security zone is formed by grouping one or more network functions. Each security guard is configured to receive an incoming message from a requestor external to corresponding internal security zone and validate the extracted information against each other, and against a service specification policy for the communication network, and against threat intelligence analytics data. Each security guard is configured to compute one or more risk scores indicating risk perception or incidence of attack for its associated internal security zone and to initiate one or more attack preventive measures if a computed risk score exceeds a predetermined threshold. such as modifying or correcting or dropping the incoming message.

10 Claims, 7 Drawing Sheets

(56) References Cited

U.S. PATENT DOCUMENTS

| | | | |
|---|---|---|---|
| 11,510,052 B2* | 11/2022 | Zhang | H04L 9/30 |
| 2019/0021047 A1* | 1/2019 | Zong | H04W 40/24 |
| 2019/0098569 A1* | 3/2019 | Hou | G06F 16/2471 |
| 2019/0110195 A1* | 4/2019 | Ito | H04W 12/106 |
| 2022/0295283 A1* | 9/2022 | Joo | H04W 12/088 |

OTHER PUBLICATIONS

Hu et al. "4th revised baseline text for X.nsom-sec: security requirements and architecture network slice management and orchestration." Int'l Telecommunication Union, Telecommunication Standardization Sector, SG17-5D3561 Study Group. (Apr. 20-30, 2021).

* cited by examiner

SYSTEM AND METHOD FOR SECURING A COMMUNICATION NETWORK

PRIORITY

This application claims priority to and the benefit of Patent Application No. EP21154426.7 filed in the European Patent Office on Jan. 29, 2021, the entire content of this application being incorporated herein by reference as if fully set forth below in its entirety and for all applicable purposes.

TECHNICAL FIELD

The present disclosure relates to mobile core network communication security for 5G, and slicing and virtualization security and communication of virtual network functions. More particularly the disclosure relates to a system and method for securing a sliced wireless communication network by dividing the network into a plurality of internal security zones.

BACKGROUND

Network slicing in modern wireless communication networks such as Fifth Generation (5G) mobile wireless communication networks, allows using of virtualized and logical networks on the same physical network architecture. A network slice is a logical block in a network, tailored to serve the purposes or requirements of a specific application. Such purposes include, for example, massive Machine Type Communication (mMTC) to serve Internet of Things (IoT) devices, enhanced Mobile Broadband (eMBB) to serve entertainment applications, Vehicle to X (V2X) to serve connected/self-driven cars, and applications that need high-speed Ultra-Reliable Low Latency Communications (URLLC), and Mobile Virtual Network Operator (MVNO).

Network slicing is an enabler technology that allows the connecting of all kind of partners to the communication network. Typical use cases include traffic management, self-driving cars, smart city, health, factories, private network, military (as extension to their own network), police, ports, and entertainment. The communication network is a critical infrastructure and need to be protected as such. Therefore, potential attacks on slices and network can have severe impacts on the availability, integrity and data confidentiality, of all the use cases. 5G also provides for all new use cases much better location tracking features, that allow tracking in range of few meters or even more precise.

Each network slice has certain characteristics related to Quality of Service (QoS), for example, to support large bandwidth or short round-trip times etc. Depending on the specific purpose, different slice types with specific QoS characteristics have been defined. For example, a streaming service and a private network of a hospital may need the same slice type with high throughput and low latency, even though the use cases are different. A slice in the core network consists of a group of Network Functions (NFs) which support that slice. Those network functions can be exclusively assigned to that slice or can be shared among different slices. A shared network function can provide services to several slices. The network function may be virtual or physical. A physical node may host several network functions in 5G or future networks. It may even integrate legacy nodes from previous generations. A network function can also be a router or a proxy.

The network functions mentioned in the figures are typical examples related to slicing, but network slices may also encompass other types of network functions and nodes or a combination of thereof. Examples are application servers, session management functions, packet gateways, serving gateways, home subscriber server, policy and charging rules function, policy control functions, equipment identity register, charging function, network data analytics function, network exposure function, short message service function, user data repository, authentication server function among others.

It is possible that some of these network functions might not belong to the hosting network operator or the hosting service provider, but to a third party, and a third party therefore may have access to the core network. For example, consider the scenario wherein a host network operator is hosting two network slices:—Slice 1 for gaming and Slice 2 for IoT devices. Referring to FIG. 1, Slice 1 would have its own dedicated network functions like a User Plane Function (UPF) for data, Policy Control Function (PCF) for policy control etc. However, as illustrated in FIG. 1, Slice-1 would not only consist of the dedicated network functions in the Slice-1 'box', but also the UDR (Unified Data Repository), AMF (Access Management Function) and Security Edge Protection Proxy (SEPP) from the shared network functions 'box'. The network functions in the shared box would be available to be used by the slices and the hosting operator. The Slice 1 gaming company may want to offer content close to the proximity of the user and therefore they take ownership of the User Plane Function (UPF). On the other hand, the gaming company may not want to run the Access Management Function (AMF) themselves. Likewise, as illustrated in FIG. 1, Slice-2 would also consist of network functions dedicated to it and additionally the shared network functions UDR, SEPP and AMF would also be made available to Slice 2.

The network functions in the slice are generally managed by the host network operator, like deploying new virtual instances in case of load. But the content and the details in the network function may be managed by the third-party business partners. Further, the hosting operator may not give third party business partners full access to all its network functions, and therefore it may not share some of the network functions with its business partners in Slice 1 and Slice-2 as illustrated in the 'not shared box' in FIG. 1. This approach of having not-shared network functions, shared network functions, and slice-dedicated network functions is done to allow maximum flexibility.

While the 'Not Shared', 'Shared', 'Slice 1' and 'Slice 2' boxes illustrated in FIG. 1 indicate a logical/business-area separation, said boxes are not completely separated at the signalling layer. All the network functions in the different boxes—that is the slices, shared network functions, and not-shared network functions—are connected to the network operator's Service Based Architecture and its interfaces. This is because all said network functions need to exchange signalling messages with each other. In case two slices may want to communicate with each other, they would use the Service Based Architecture interfaces connecting them.

Network security mechanisms known in the art such as Internet Protocol (IP) firewalls, Transport Layer Security (TLS), IP security (IPSec) on transport and IP layer, or the Network Resource Function (NRF), or Service Communication Proxy (SCP) are not sufficiently equipped to prevent potential attacks against sliced communication networks, i.e. attacks against control plane traffic inside the core network. The control plane traffic includes communication between core network functions of different security levels inside or connected to an operator network. The control plane carries the signalling traffic, i.e. use of signals for controlling communications. The attacks include attempts to gain unauthorised access to sensitive user data, denial of service attacks, or other cybersecurity threats. A few examples of potential network security attacks/threats due to deficiencies in the art, have been illustrated in FIG. 2, FIG. 3, and FIG. 4.

For the purposes of FIG. 2, FIG. 3, and FIG. 4, it is assumed that the communication network comprises of two slices, and that Slice-2 is compromised and has gone rogue. As an operator will have many partners health, automotive, entertainment, smart city allocated the use of a slice it is prudent to assume, that one of them could be compromised.

As illustrated in FIG. 2, the rogue network function which is part of Slice-2 would first establish a TLS connection to the NRF 201. The rogue network function is authorised to contact the NRF since it is part of Slice-2 202. The rogue network function which is part of Slice-2 would subsequently request the NRF for a token to access Slice-1 on the shared Network Function (NF) server wherein said request would specify slice identity as 'Slice-1' 203. The NRF would check in turn check if the network function that the rogue slice wants to access is allowed to be accessed, but since the target network function is a shared network function for Slice-1 and Slice-2, the performed check would not result in dropping the request. The rogue network function is consequently allowed to access the shared network function 204 and a valid token for Slice-1 on the shared NF server would be generated which would be sent to the rogue network function by the NRF 205. The rogue network belonging to Slice-2 further presents to the shared network function server the token for Slice-1 206, and since the shared network function would rely on the NRF to have performed all necessary authorisation checks, the token is accepted by the shared network function 207. If the transport/IP layer security is used between the network function belonging to Slice 2 and the shared network function, a valid connection would be established. Therefore, the service request from the rogue network would be delivered which could be sensitive personal data such as user identity, user location or in other words the attack has revealed the user identity to the hacker that is controlling the rogue network which is part of Slice-2. A potential attack scenario could be that a slice for logistics may go rogue and obtain information via the means above from users belonging to a military slice.

Another potential network challenge is related to the HTTP header of 5G messages sent between network functions, and the validation of elements within incoming messages. This has been illustrated in FIG. 3. As shown, the rogue network function which is part of Slice-2 would first establish a TLS connection to the NRF 301. The rogue network function is authorised to contact the NRF since it is which is part of Slice-2. The rogue network function requests an access token from the NRF for a service specifying Slice identity as Slice-2, which would be authorised by the NRF since its valid 302 and the NRF subsequently responds with the requested access token 303. The rogue network function further creates a HTTP message with a service request for Slice-2 and an overload header for Slice-1 304. The shared network function receiving said message would validate the token for the usage of the network function Application Programming Interface (API) issued to Slice-2 and the overload header information would potentially not be further cross checked against the token used for the network function API service access 305. Consequently, the service providing network function would assume that Slice-1 is overloaded and hence should not be contacted, for example with notifications 305. This overload situation would be stored with the corresponding time information given in the header and the service would be delivered to Slice-2 as requested 306. Hence despite normal service operations, Slice-1 would be marked as overloaded resulting in a denial-of-service attack against Slice-1. Methods and systems known in the art are not equipped to prevent an attack of this sort which could potentially result in partial network delays or outages of critical elements of the network.

FIG. 4 illustrates another potential attack due to deficiencies in the art. It is assumed that the Access Management Function (AMF) is shared between Slice-1 and Slice-2. As illustrated in FIG. 4, a rogue network function belonging to Slice-2 would first register as a service consumer with NRF 401 and then send a request to use the services of AMF for Slice-2 402. Since AMF is shared between Slice-1 and Slice-2, the NRF would generate a token 403 and send it to the rogue network function in Slice-2 404. The rogue network function subsequently creates a service request to AMF with token for Slice 2 in which a User Equipment (UE) identity from Slice-1 is mentioned in the service request 404. The AMF would assume that the NRF has performed all authorization duties, and it only checks if the token is valid 405. However, this validity check solely verifies the correctness of the NRF issued token for Slice 2 and whether the request is initiated from the correct network function belonging to Slice 2. The AMF does not validate whether the UE identity mentioned in the service request belongs to Slice 2, and therefore it would assume that the request is valid and would hence respond to the service request, for example by providing location information of the UE in Slice-1, to the rogue network function. During the whole communication process there was no check whether the UE identity in the service request sent from the rogue network function to the AMF should be accessible to Slice-2. There is hence a risk of information leakage between shared and dedicated network functions through information elements due to deficiencies in the art. Again, the information leakage can result in serious sensitive information loss. A foreign government could track through the AMF location service governmental personnel. In addition, the outlined attacks may result in fraudulent charges, as services are used by the rogue slice and in some cases with another user's identity.

While TLS and IPSec are used for cloud security in cloud deployments of virtualized functions, they do not protect against those attacks. It can be assumed that the attacker is using an existing partner, or it could also be an existing partner is compromised, for example through malware. In both cases a partner would launch attacks against other slices using the specific structure of messages in the communication network.

WO 2020/068521 discloses techniques for providing network slice-based security in mobile networks by extracting network slice information for user traffic associated with the new session at the security platform, and determining a security policy to apply at the security platform to the new session based on the network slice information. However, WO 2020/068521 stand-up against attacks coming from user traffic from end user devices, and not from network functions associated with existing trusted business partners in the core network. The security platforms of WO 2020/068521 sit on interfaces that carry user data traffic, and does not protect the core network and control plane traffic. In an example, the security platform of WO 2020/068521 detect a virus in user traffic, i.e. from an infected device, but does not filter messages coming from network functions associated with trusted business partners.

There is therefore an unfulfilled and unresolved need in the art for a system and method for securing control plane traffic in a sliced communication network that is adapted to run a plurality of network functions, and this forms the primary objective of the present invention.

SUMMARY

The present invention relates to a system and method for securing control plane traffic in a sliced wireless communication network by dividing the network into a plurality of internal security zones and allocating a dedicated pre-configured security guard for each internal security zone, that extends existing cloud security as set out in the appended claims.

In an embodiment of the present invention, there is provided a system for securing control plane traffic in a sliced communication network that is adapted to run a plurality of network functions. The system includes a plurality of security guards, each placed at an edge of an internal security zone, wherein the internal security zone is formed by grouping one or more network functions, and a non-transitory means having a plurality of instructions stored thereon which configures each security guard to receive an incoming message from a requestor external to corresponding internal security zone, wherein the requestor is a network function of a third party; extract identity information of the requestor based on the incoming message from the network transport layer and IP layer during security channel establishment; extract message attributes and message body information of the incoming message from the network application layer; validate each of the extracted identity information, message attributes, and incoming message body information, against each other, and a business policy between the third party, and an operator of corresponding internal security zone, and against threat intelligence analytics data; compute one or more risk scores indicating security threat levels for the associated internal security zone and incidence of an attack on the associated internal security zone, based on the validated information; and enable one or more acts of modification of the incoming message or preventing delivery of one or more incoming messages or triggering additional network security measures, if at least one risk score exceeds a predetermined threshold.

In an embodiment of the present invention, the business policy includes a mapping of sensitive information elements and slice identifiers, and a mapping of slice identities and network functions.

In an embodiment of the present invention, each security guard is configured to perform validation by matching of identity information with one of: information from messaging layer and identity elements, slice identity, and the mapping of slice and network functions.

In an embodiment of the present invention, each security guard is configured to perform validation by matching service request identifier, and the access token with sensitive information elements, the mapping of sensitive information elements and network functions, and slice and node information from an authorization token.

In an embodiment of the present invention, each security guard is deployed between one of: sliced network and an interconnection network, two network slices, shared and non-shared network functions, dedicated network functions and a shared infrastructure, and 5G network functions, and elements of legacy generations.

In an embodiment of the present invention, each security guard is collocated with one of: a Network Resource Function (NRF), a Network Slice Selection Function (NSSF), a Service Communication Proxy (SCP), a Security Edge Protection Proxy (SEPP), Protocol interworking functions (IWFs) for legacy support, a Diameter Routing Agent (DRA) and a firewall.

In an embodiment of the present invention, each security guard is one of: a virtualized instance and a physical network node.

In one embodiment the sliced communication network system is adapted to run a plurality of network functions. The system as per a preferred embodiment of the present invention comprises a plurality of security guards and a non-transitory memory means. Each internal security zone has a dedicated security guard on the network application layer. The plurality of internal security zones comprises one or more network slices, one or more shared network functions, one or more non-shared network functions, one or more network functions dedicated for each communication network slice, interconnection networks, and legacy network nodes.

In one embodiment the memory means has a plurality of instructions stored on it which configures each security guard to extract information from incoming messages to each internal security zone. It will be appreciated that the memory means can be stored locally on site or at a remote location. Said information comprises at least two or more of the following: identity information pertaining to one or more incoming messages from the network transport layer, incoming message attributes from the network application layer, and incoming message body information from the network application layer.

In one embodiment the security guards are configured to validate the extracted identity information, incoming message attributes, and the incoming message body information against each other. The extracted information is also validated against a service specification policy for the communication network and against external threat intelligence analytics data which includes attack heuristics, existing attack patterns, attack correlation with other protocols, threat intelligence feeds, and historical slice data. The service specification policy data can be dynamically fetched, fed into the policy in regular intervals e.g. attacker node updates or be provided in an internal or external repository. The service specification policy is a technical instantiation of a business agreement between third-party partners, and/or between third party partners and the network operator. The service specification policy includes a list of mappings between slice-identities and network functions/nodes and defines the network security approaches agreed between the third-party business partners and between the third-party business partners and the host network operator.

In one embodiment each security guard is further configured to compute one or more risk scores indicating security threat levels for the associated internal security zone and incidence of an attack on the associated internal security zone, based on the validated identity information, message body information, and message attributes. If the one or more risk scores exceeds a predetermined threshold which indicates a higher security threat level or an incidence of an attack against the associated internal security zone, the security guard is configured to either enrich the incoming message with risk score or threat information or prevent delivery of incoming messages or modify the incoming message before delivery. The security guard is also configured to take additional network security measures such as raising a security alarm, forwarding the incoming message to a Security Information Centre, quarantining the incoming message, and forwarding the incoming message for further inspection, to generate decisions on further traffic actions, and threat analysis for internal and external use, such as use in threat feeds and other correlations.

In another preferred embodiment of the present invention, a method for securing control plane traffic in a sliced communication network is provided. The communication network is adapted to run a plurality of network functions and is divided into a plurality of network security zones. The method comprises the steps of allocating a dedicated security guard for each internal security zone and configuring each security guard to extract identity information pertaining to one or more incoming messages from the network transport layer, extract incoming message attributes from the network application layer, and extract incoming message body information from the network application layer.

In an embodiment of the present invention, the extracted identity information comprises at least two of: node identity information, network function identity information, and slice information associated with the requestor.

In an embodiment of the present invention, the extracted message attributes comprises at least two of: service request identifiers (provide location or similar), slice identities used in the message attributes slice related header information, and an access token from service request.

In an embodiment of the present invention the extracted message body information comprises values of sensitive information elements which includes one or more of the following: user location related information, user identity, user group identity, session identifiers, service identifiers, software identifiers and charging identifiers.

In one embodiment the method further comprises the step of configuring the security guard to validate the extracted identity information, application network message attributes and message body information against each other, and against a service specification policy for the communication network, and against external or internal threat intelligence analytics data.

The analytics data can include one or more of the following: attack heuristics, existing attack patterns, attack correlation with external protocols, attack correlation with lower layers of the communication network, threat intelligence feeds, and historical slice data. The security guard is further configured to calculate one or more risk scores based on the validated information. The one or more risk scores quantifies the security threat level for each associated internal security zone and indicates incidence of an attack against the associated internal security zone. The method further includes the step of configuring the security guard to modify one or more incoming messages or preventing delivery of one or more incoming messages, or triggering additional network security measures, if at least one risk score exceeds a predetermined threshold.

In an embodiment of the present invention, the sliced communication network is a fifth-generation or sixth generation and/or future wireless mobile communication network.

A sliced communication network can be used by various applications which may include applications wherein a high density of personal information or information related to national security may be handled, such as for example, applications related to health care, military networks, or connected cars. The consequences of cyberattacks on such communication networks could be catastrophic. The attacks could potentially reveal user's location, divert traffic, and perform financial fraud. Those vulnerabilities pose a problem for the security of those sensitive customers and for the availability of the mobile network.

The present invention plugs security vulnerabilities in sliced communication networks and therefore prevents data theft and cyber fraud due to network security breaches. The present invention further prevents network outages and consequent financial losses and fraudulent service usage and other implications due to denial-of-service attacks.

The present invention protects the network as a critical infrastructure, and focuses on the control plane traffic i.e., communication between core network functions of different security levels inside or connected to an operator network. The present invention stands-up against attacks coming from network functions associated with existing trusted business partners of a host operator, and not from phones, devices, or user terminals.

The present invention hence provides a robust and economic solution to problems identified in the art. Other advantages and additional novel features of the present invention will become apparent from the subsequent detailed description.

BRIEF DESCRIPTION OF THE DRAWINGS

The invention will be more clearly understood from the following description of an embodiment thereof, given by way of example only, with reference to the accompanying drawings, in which:—

DETAILED DESCRIPTION

The present invention relates to a system and method for securing control plane traffic in a sliced communication network, for example, a fifth generation wireless mobile communication network, and more particularly to a system and method for securing the control plane traffic in a sliced wireless communication network by dividing the network into a plurality of internal security zones on network application layer and allocating a dedicated pre-configured security guard for each internal security zone.

The network is divided into internal security zones based on security levels of each zone, for example, network functions having the same security level are grouped together into one internal security zone. The internal security zones may comprise of one or more network functions which belong to one or more slices. A slice can be serving use cases such as Massive Machine Type Communication (MTC) and Mission Critical MTC. A security zone contains zero or more shared network functions, one or more non-shared network functions, one or more network functions dedicated for each communication network slice, interconnection networks, and legacy network nodes such as a second generation or third generation or fourth generation network mode connected to the sliced communication network via an interworking function. The plurality of network functions may be physical or virtual. A network function may be a legacy node e.g. 2G, 3G or 4G network nodes that is connected to a 5G core network via an interworking function. The present invention may also apply to future networks 6G and beyond.

Figure 1:
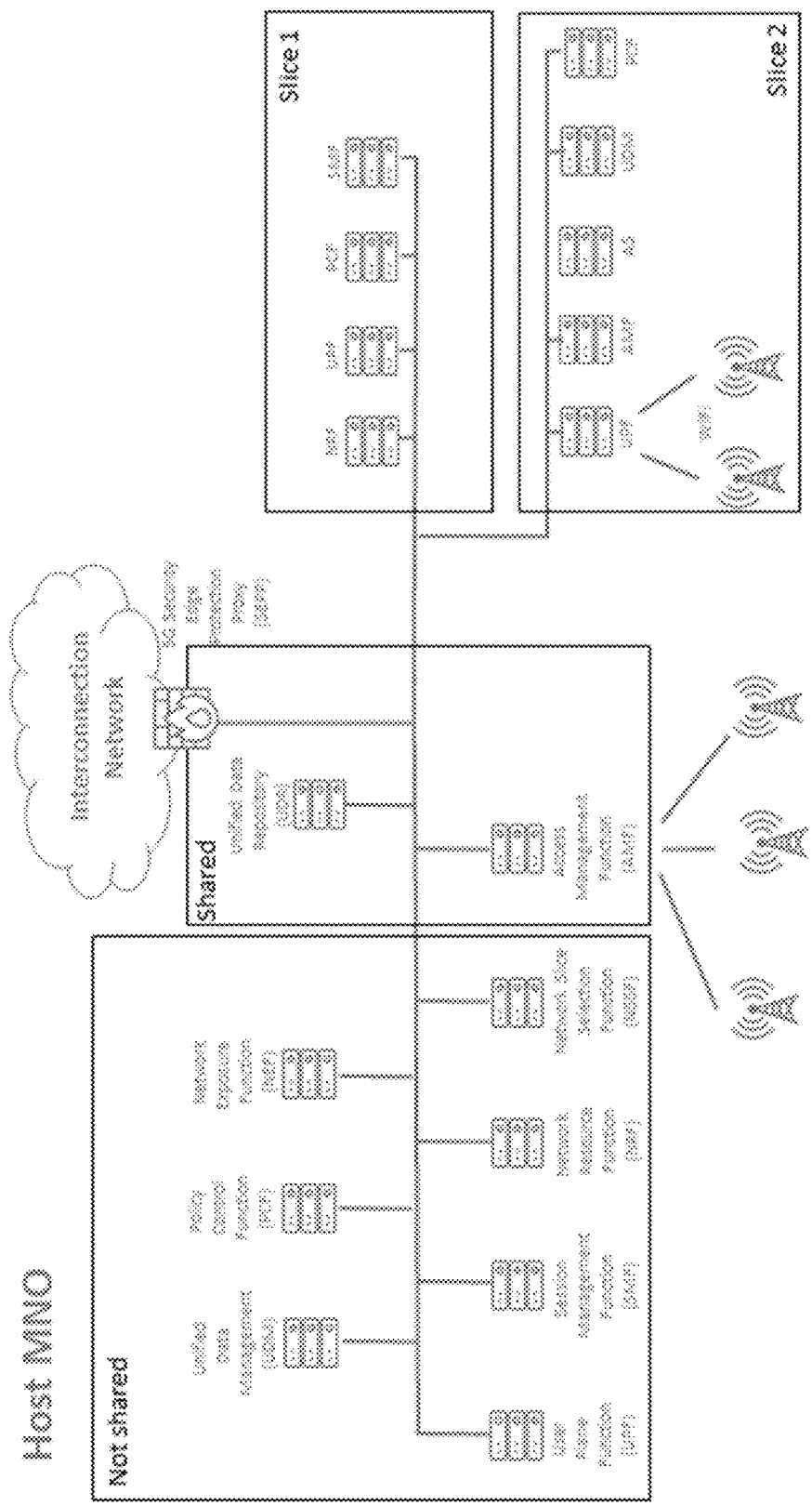
FIG. 1 is a schematic diagram illustrating a conventional sliced communication network adapted to run a plurality of network functions.
Figure 2:
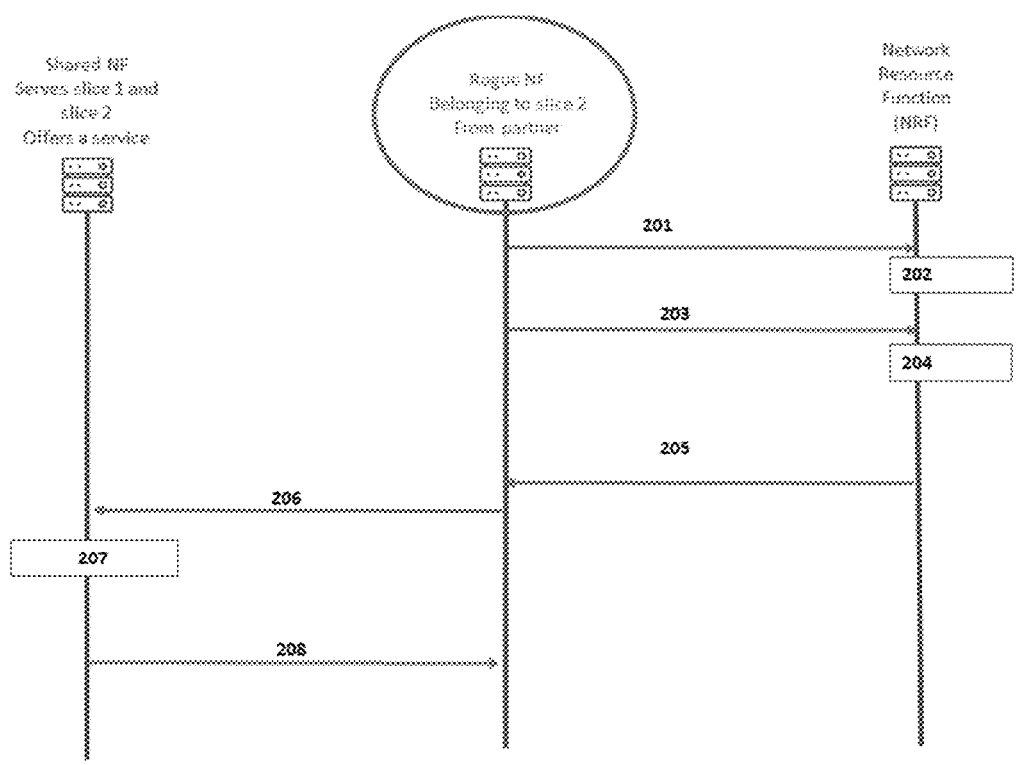
FIG. 2 is a schematic diagram illustrating a network security breach in a conventional sliced communication network due to deficiencies in the art.
Figure 3:
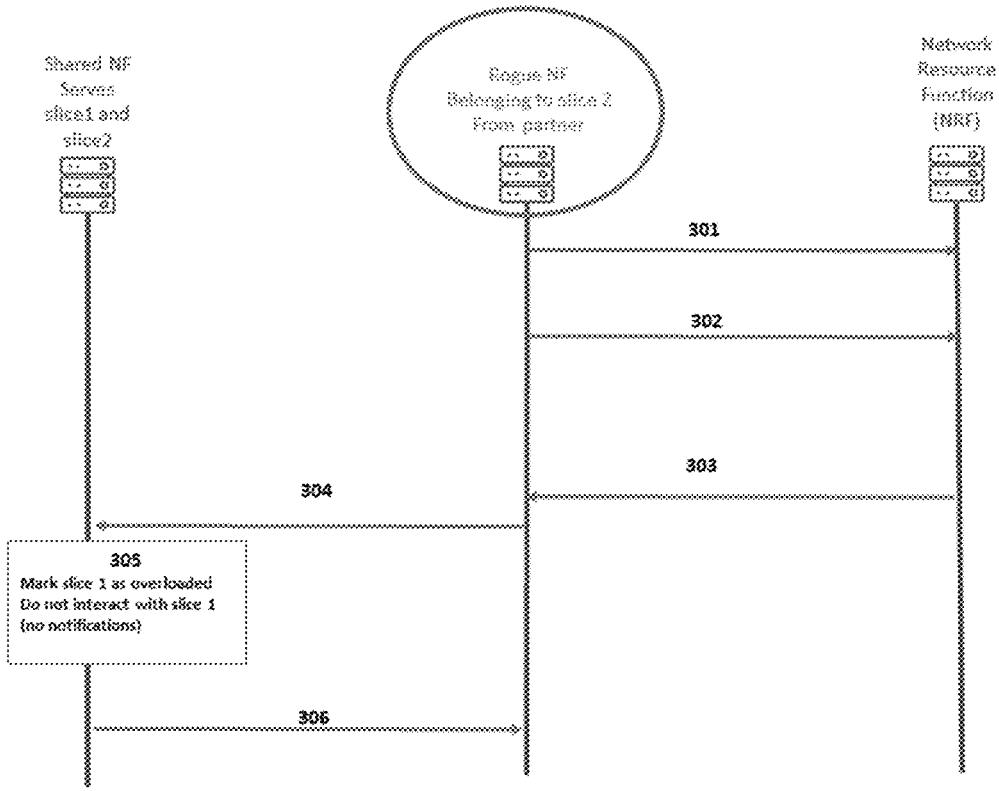
FIG. 3 is a schematic diagram illustrating another network security breach in a conventional sliced communication network due to deficiencies in the art.
Figure 4:
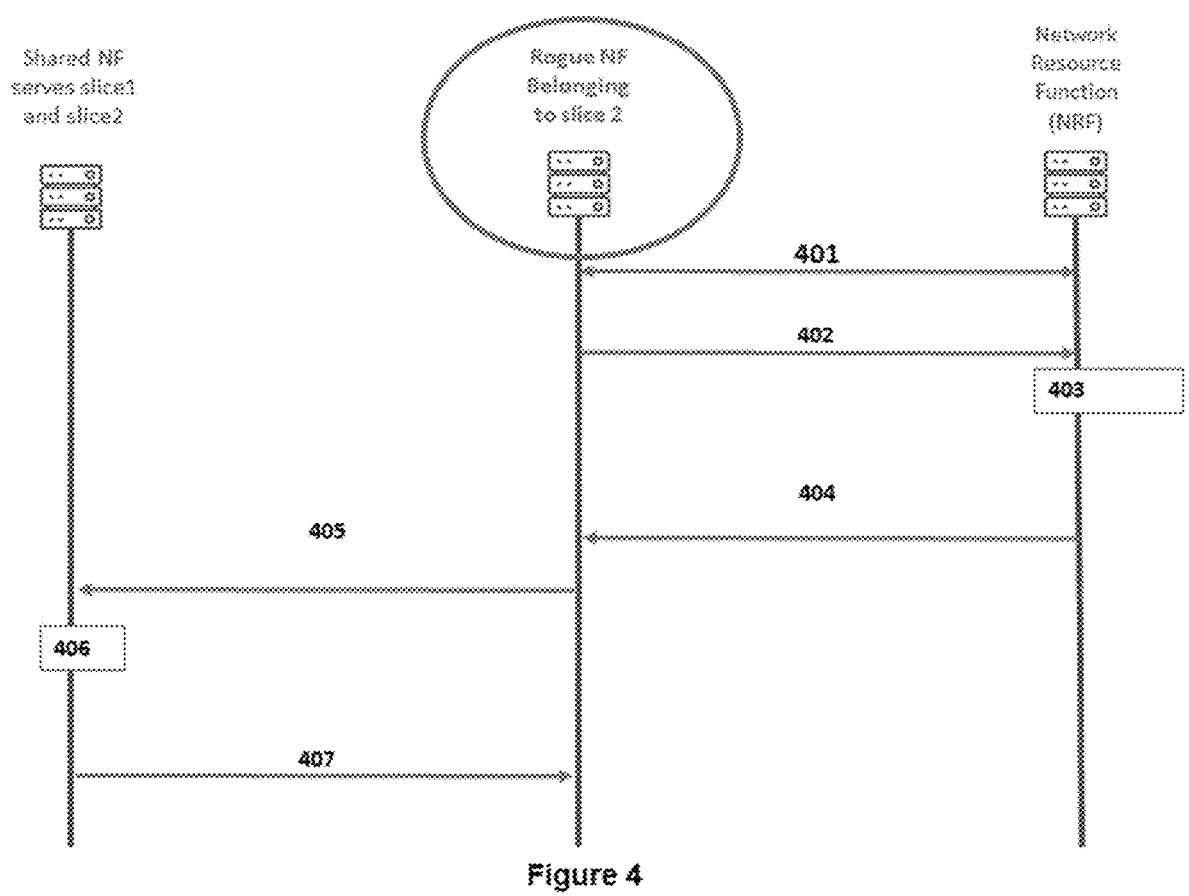
FIG. 4 is a schematic diagram illustrating another network security breach in a conventional sliced communication network due to deficiencies in the art.
Figure 5:
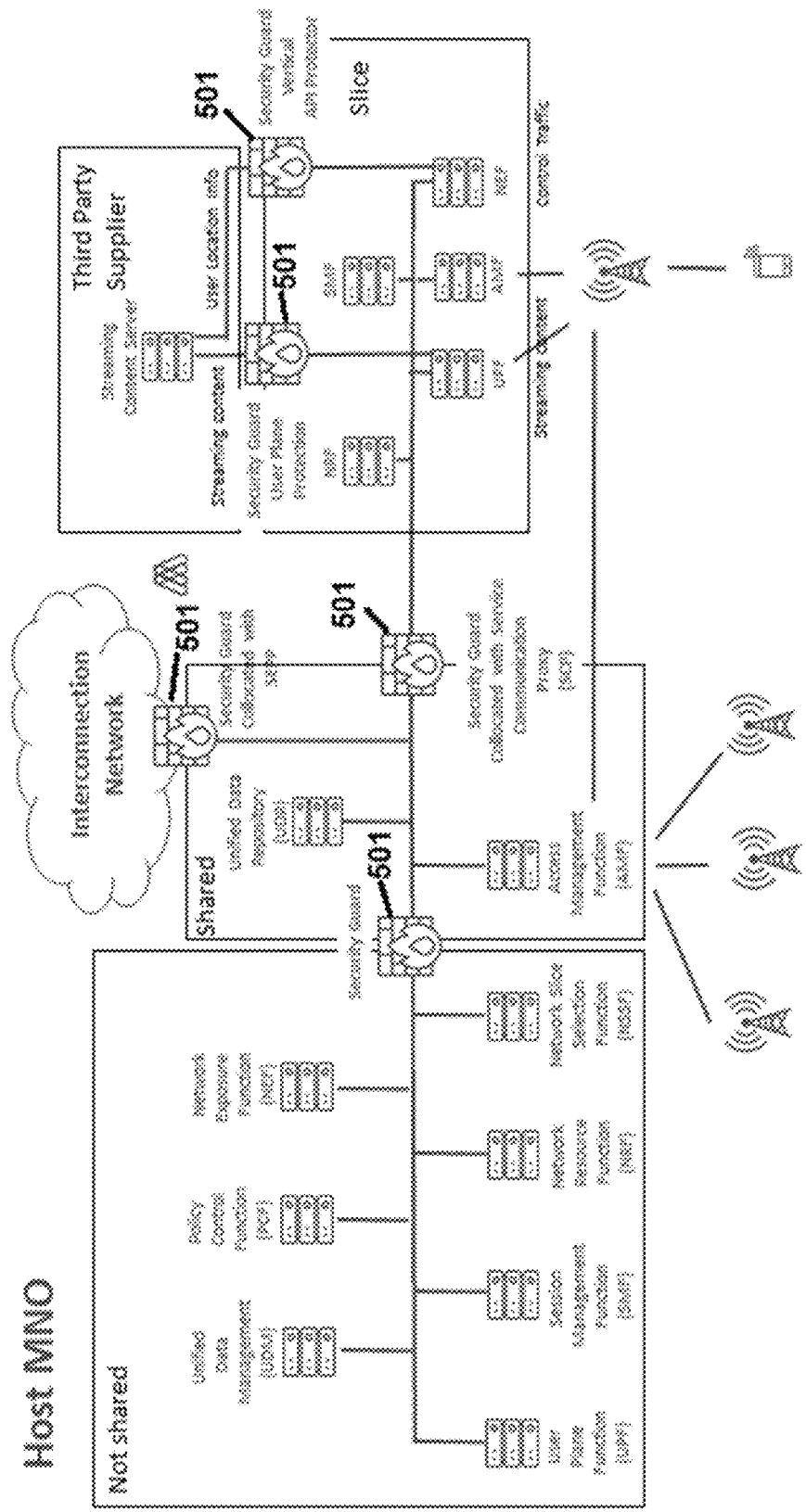
FIG. 5 is a schematic diagram illustrating the architecture of a system as per a preferred embodiment of the present invention.
Figure 6:
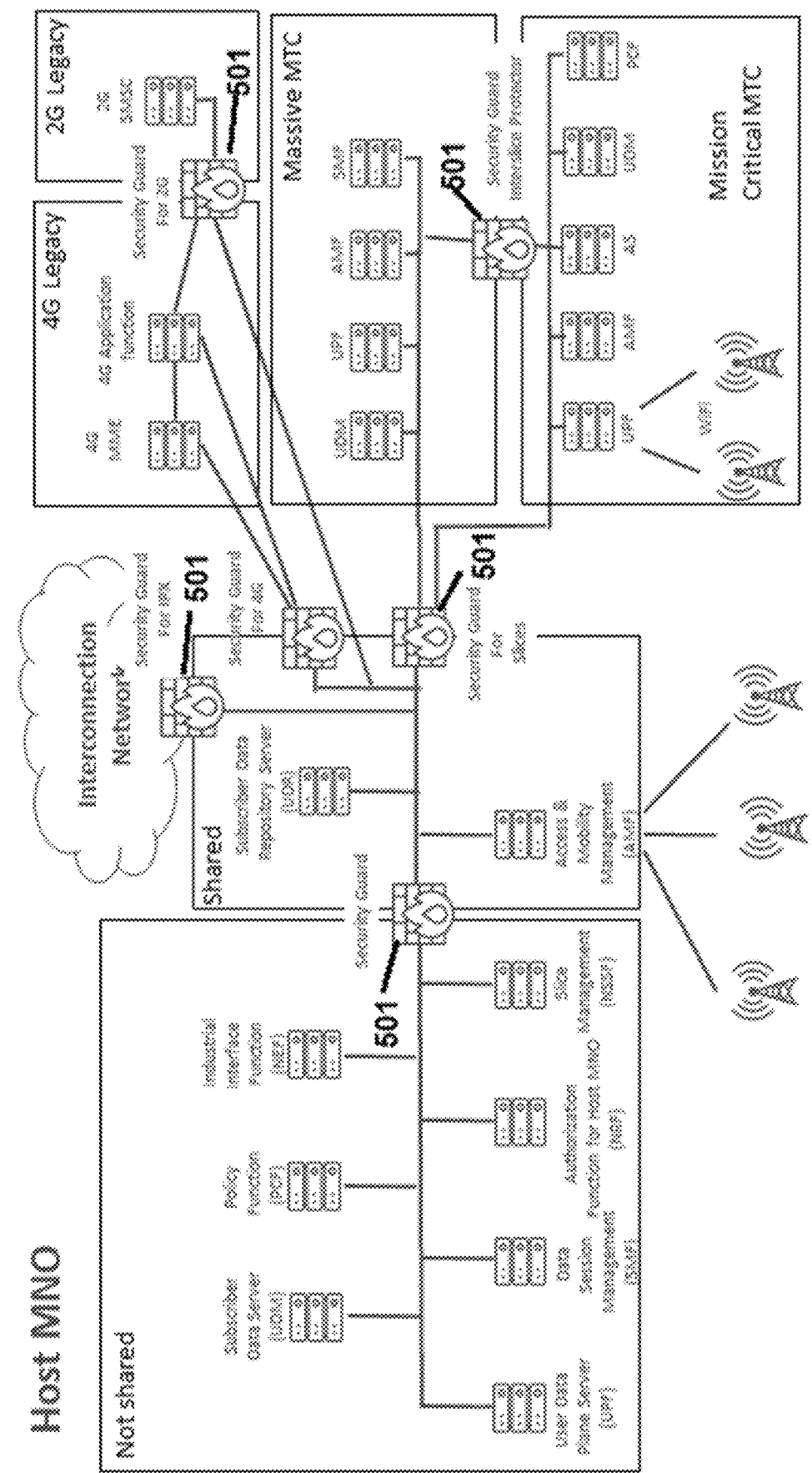
FIG. 6 is a schematic diagram illustrating the architecture of a system as per another preferred embodiment of the present invention.

FIG. 5 and FIG. 6 are schematic diagrams illustrating the architecture of a system as per various preferred embodiments of the present invention. As shown the system comprises a plurality of security guards 501 such that each internal security zone has a security guard 501 dedicated to it. The system further comprises a non-transitory memory means having a plurality of instructions stored thereon which configures each of the security guards 501 to have a specific set of features which enables prevention of breach of network security. The memory means may be any internal or external device or web-based data storage mechanism adapted to store data.

In general terms, the network (including third parties) is divided in zones with different trust or technology level. On the edges of each of those zones, a security guard 501 is placed.

Each security guard 501 may either be standalone or may be collocated with an existing or new network function. This may include collocation with Network Resource Function (NRF), Network Slice Selection Function (NSSF), Service Communication Proxy (SCP), Security Edge Protection Proxy (SEPP), Protocol interworking functions (IWFs) for legacy support, Diameter Routing Agent (DRA) or with an existing firewall. The security guard 501 may be a virtualized instance or a physical network node. The security guard can also be deployed in collocation with a standard network function and deployed as a protection for that individual function e.g. for the UDM.

In an embodiment of the present invention, the security guard 501 can be deployed at the following example points in a 5G network:
  Between the network and the interconnection network (Interconnection Network (IPX))
  Between network slices (inter-slice communication)
  Between shared and non-shared network functions
  Between the dedicated network functions and the shared infrastructure, and
  Between the 5G network functions and elements of legacy generations such as 2G, 3G and 4G.

Each security guard 501 is configured to receive an incoming message from a requestor external to corresponding internal security zone, wherein the requestor is a network function of a third party. Thereafter, each security guard is configured to perform an information extraction phase based on the incoming message, which includes:
  Low level extraction—The security guard 501 extracts node or network function identity information of the requestor from lower stack layers (i.e. transport or IP layer) during the security channel establishment. This identity information pertains to at least one of: node, network function, and slice information associated with the requestor.
  Extraction of message related attributes from the application layer—The message high level information includes service request identifier, slice identities used in message related attributes, access token from service request, and header and potential slice related information in the message
  Extraction of message body information from the application layer—The message body information includes identification of sensitive information elements such as location, charging identifier, and policy information, and extracting the values if the sensitive elements are found.
  Business information extraction—Each security guard 501 has a business policy stored. That policy can be the technical instantiation of a service level agreement between a third party and an operator, a slice owner and an operator. That policy can also be the risk policy of an operator regarding to its legacy or internal security zones. The policy might be pre-installed or fetched from an external database. This policy at least contains the following lists, sensitive information element, slice identifier mapping, and a list of mappings between slice-identities and network function/nodes.

Each security guard 501 is then configured to process the extracted information. The security guard 501 matches at least one slice specific information with a business related service information and information from lower layer or inside the message body.

In a first example, the security guard 501 matches transport and IP layer identity information (e.g. TLS/IPSec end point information) with information from messaging layer and identity elements therein (e.g. OCI header slice information, node information, network function information used therein), slice identify information from service API related requests (e.g. slice identity S-NSSAI), and business information on slice/node mapping.

In a second example, the security guard 501 performs matching with threat intelligence analytics data like attack heuristics, existing attack patterns, analytics from other sources (e.g. attack correlation with other protocols, threat intelligence feeds, historical slice data).

In a third example, the security guard 501 performs matching of service request identity and token with business logic and sensitive elements in requests, business information on slice/user list and slice and node information from authorization token.

In a fourth example, the security guard 501 performs matching extracted security and identity information against a service level policy to determine the correctness and potential risk of such requests and take potential actions.

The security guard 501 calculates a risk score, which has two elements, clear trigger which indicate that this is an attack, and at least one score indicating the threat level based on the accumulated values of the weighted individual checks.

If the risk score is over a certain threshold or ticks the indicators for an attack, then one or several of the following actions can take place:
  Enrich message with score and threat information and Forward message to SIEM (Security Information Center)
  Quarantining message, Forwarding messages for further inspection and threat analysis Raising an alarm Correlating the attack information with other attack information e.g. from interconnection firewall, legacy protocol protection, bad actor list Correcting message:

Dropping of part of the message e.g. requests of sensitive elements,

Replacing and correcting parts of the message e.g. slice identifier (optional)

Correcting message formatting aspect (optional)

Silently:

Dropping of whole message silently (also mandatory feature)

Dropping of part of the message e.g. requests of sensitive elements

In the context of the present invention, the users pertain to third-party business partners in the core network, and not end users. In an example, the user of the present invention would be a mobile core network function residing e.g., in a big car manufacturing plant and trying to extract all location information from a competing car manufacturers test cars. Herein, the incoming messages come from partners which are more or less trustworthy and target other parts of the network for mobility information, fraud or similar.

Figure 7:
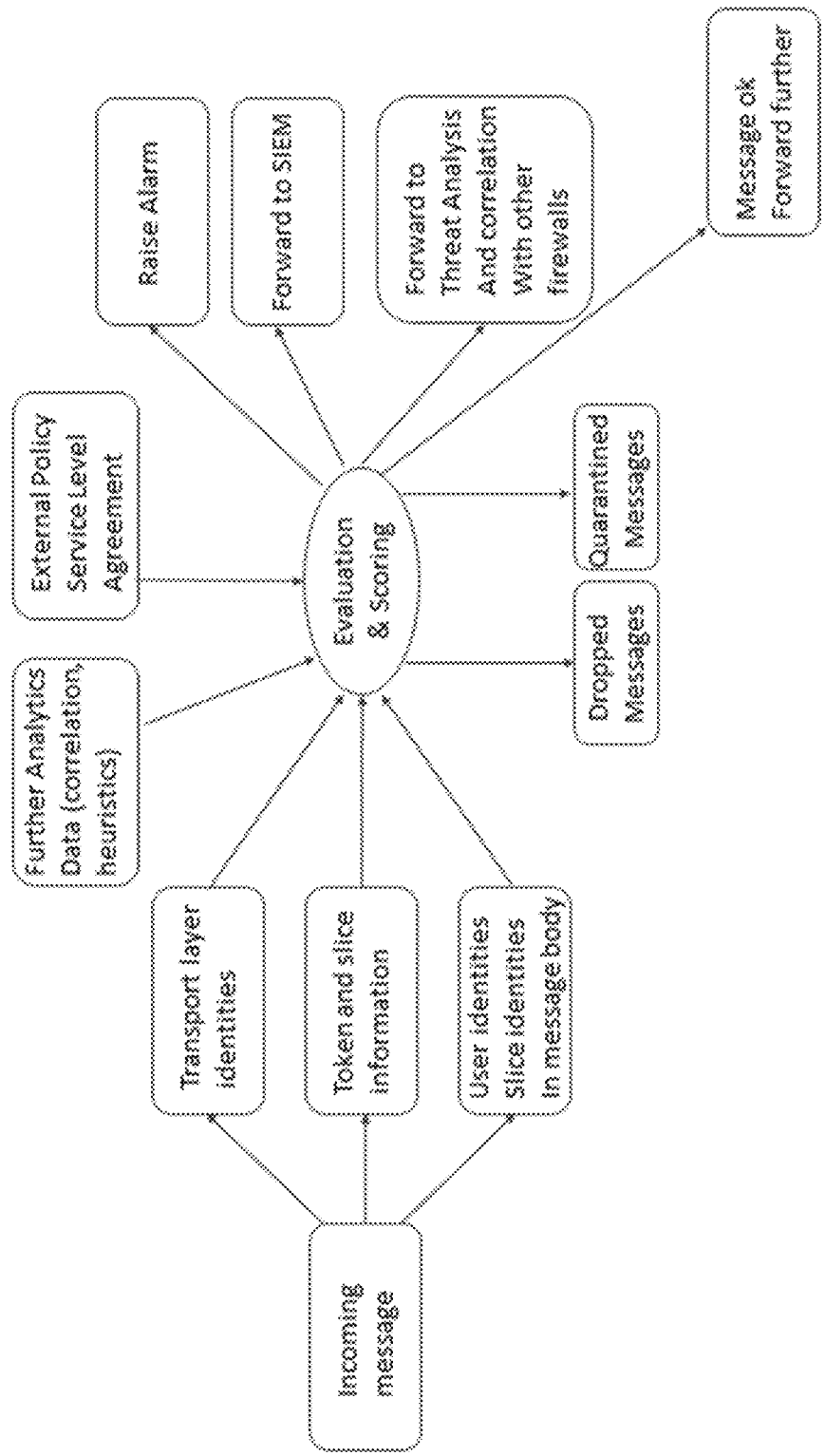
FIG. 7 is a block diagram illustrating processing of incoming messages for each internal security zone by each dedicated security guard.

Each security guard 501 is configured to extract information from each incoming message designated for its associated internal security zone. FIG. 7 illustrates the processing of incoming messages for each internal security zone by each dedicated security guard 501.

Such extracted information includes identity information pertaining to one or more incoming messages from lower stack layers (the network transport layer). The extracted identity information can also include node identity information, network function identity information, and network slice identity information. Such extracted information can further include incoming message related attributes and incoming message body information extracted from the network application layer. The extracted incoming message related attributes includes high level information such as service request identifiers, slice related information in incoming message headers, and information related to access tokens in service requests. The extracted incoming message body information can include values of sensitive information elements such as user location requests, user identity requests, user equipment identity requests, session identifiers, and charging identifiers.

The information extracted by the security guard 501 is stored in the memory means for further processing.

The security guard 501 is configured to validate each of the extracted identity information, incoming network application message attributes, and incoming message body information, against each other, against a service specification policy for the communication network, and against external or internal threat intelligence analytics data which includes attack heuristics, existing attack patterns, attack correlation with external protocols, attack correlation with lower layers of the communication network, threat intelligence feeds, and historical slice data. For example, the extracted identity information is matched against the incoming message attributes, the incoming message body information is matched against various specifications/data points in the service specification policy, service request identities and access tokens are matched against sensitive information elements in requests and slice/node information, etc.

The service specification policy is a technical instantiation of a service level policy between third party business partners and/or third party business partners and host network operators, and includes information pertaining to sensitive information elements, slice identifiers, and mappings between slice identities and network functions.

Each security guard 501 is configured to validate the information extracted from the incoming messages to each internal security zone, to ascertain the potential risks associated with each said incoming message and its related information (for example split messages or containers). Based on the validation of the extracted information, each security guard 501 is adapted to compute one or more risk scores indicating security threat levels for the associated internal security zone and incidence of an attack on the associated internal security zone due to each incoming message. If one or more of the computed risk scores exceeds a predetermined threshold, each security guard 501 is configured to modify the incoming message or prevent delivery of the incoming message, and/or trigger additional network security measures. Modification of the incoming message includes enriching the incoming message with the computed risk score and threat information, correcting the message by for example dropping part of the incoming message requesting for sensitive information elements or by correcting parts of the incoming message or by correcting message formatting. The triggered additional network security measures include raising a security alarm, forwarding the incoming message to a Security Information Centre, quarantining the incoming message, and taking traffic actions, and forwarding the incoming message for further inspection and threat analysis and further threat feeds and correlations.

Figure 8:
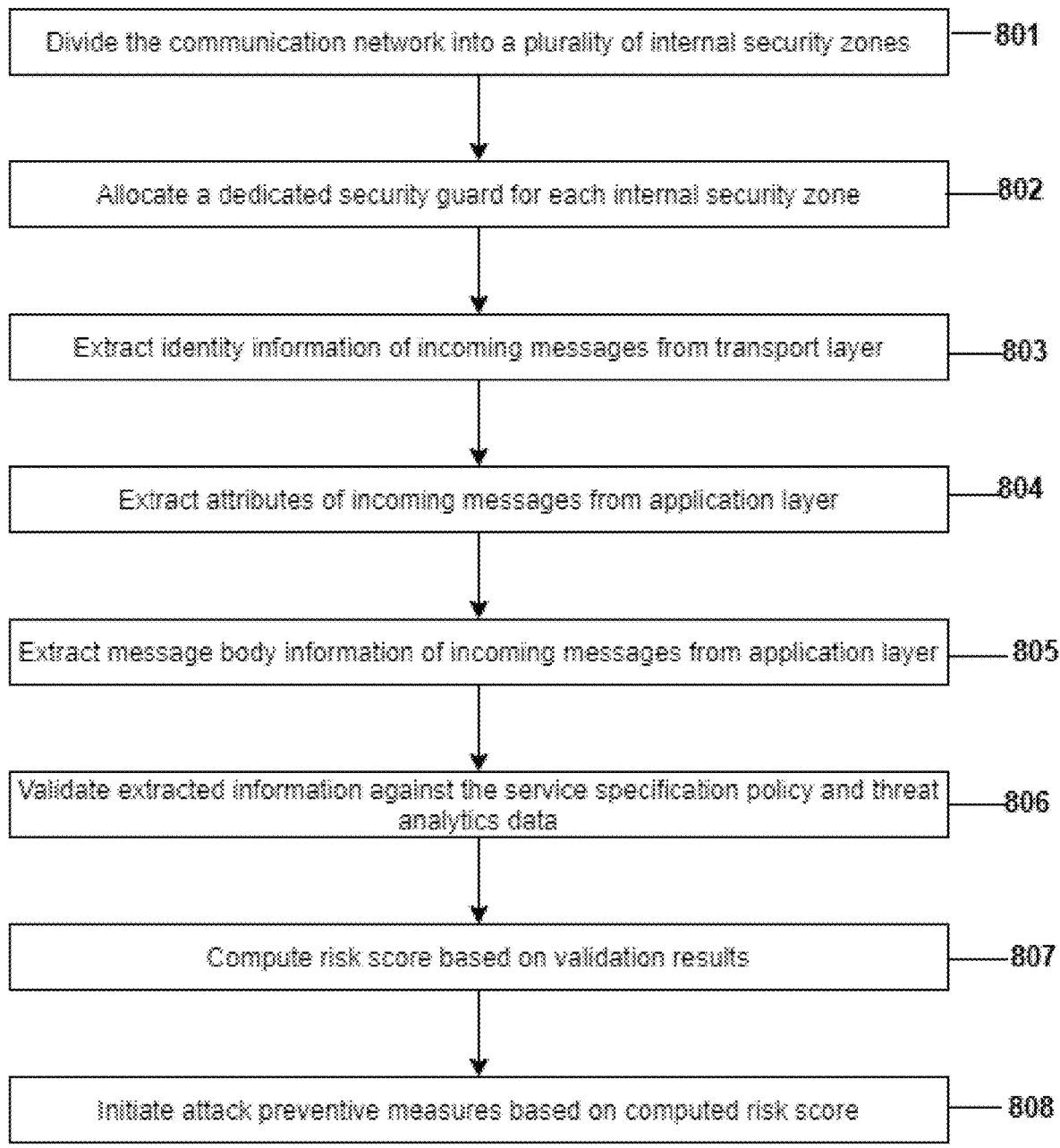
FIG. 8 is a flow diagram illustrating a method as per a preferred embodiment of the present invention.

FIG. 8 is a flow diagram illustrating a method for securing control plane traffic in a sliced communication network that is adapted to run a plurality of network functions. The communication network is divided into a plurality of internal security zones 801. The plurality of internal security zones comprises one or more network slices, one or more shared network functions, one or more non-shared network functions, one or more network functions dedicated for each communication network slice, interconnection networks, and legacy network nodes. A dedicated security guard is allocated for each internal security zone 802. Each security guard may either be standalone or may be collocated with one or more network functions or proxies.

Each security guard is configured to monitor and extract information from incoming messages to its dedicated internal security zone. The messages are from third party business partners of a host operator in the core network. Such extracted information comprises of message identity information from the network transport layer 803, incoming message attributes from the network application layer 804, and incoming message body information from the network application layer 805. Each security guard is configured to validate the extracted information against each other and against a service specification policy for the communication network 806. The extracted information is also validated by the security guard against external threat intelligence analytics data 806. Such threat intelligence analytics data includes attack heuristics, existing attack patterns, attack correlation with external protocols, threat intelligence feeds, and historical slice data. The service specification policy is a technical instantiation of a service level policy between the third-party business partners or between the third-party business partners and the host network partner. It includes information pertaining to sensitive information elements, slice identifiers, and mappings between slice identities and network functions.

Based on the validated information, each security guard is further configured to compute one or more risk scores indicating security threat levels for the associated internal security zone and incidence of an attack on the associated internal security zone due to each incoming message. Each security guard is also configured to initiate security attack preventive measures if at least one risk score exceeds a predetermined threshold 808. Such measures include modification of one or more incoming messages or preventing delivery of one or more incoming messages or triggering additional security measures. Such additional network security measures include raising a security alarm, forwarding the incoming message to a Security Information Centre, quarantining the incoming message, to generate decisions on further traffic actions, and threat analysis for internal and external use, such as use in threat feeds and other correlations.

Although the present invention has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter. It is therefore contemplated that such modifications can be made without departing from the scope of the present invention as defined.

Further, a person ordinarily skilled in the art will appreciate that the various illustrative method steps described in connection with the embodiments disclosed herein may be implemented using electronic hardware, or a combination of hardware and software. To clearly illustrate this interchangeability of hardware and a combination of hardware and software, various illustrations and steps have been described above, generally in terms of their functionality. Whether such functionality is implemented as hardware or a combination of hardware and software depends upon the design choice of a person ordinarily skilled in the art. Such skilled artisans may implement the described functionality in varying ways for each particular application or network function, but such obvious design choices should not be interpreted as causing a departure from the scope of the present invention.

The system and method described in the present disclosure may be implemented using various means. For example, the system described in the present disclosure may be implemented in hardware, firmware, software, cloud native or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software code may be stored in the memory means and executed by a processor. The memory means may be implemented within the processor unit or external to the processor unit. As used herein the term "memory" refers to any type of volatile memory or non-volatile memory.

In the specification, the terms "comprise, comprises, comprised and comprising" or any variation thereof and the terms "include, includes, included and including" or any variation thereof are considered to be totally interchangeable and they should all be afforded the widest possible interpretation and vice versa.

The invention claimed is:

1. A system for securing control plane traffic in a sliced communication network operated by a host operator and that is adapted to run a plurality of network functions, characterized in that, the system comprises:
    a plurality of security guards, each placed at an edge of an internal security zone, wherein the internal security zone is formed by grouping one or more network functions; and
    a non-transitory means having a plurality of instructions stored thereon which configures each security guard to:
        receive an incoming message from a requestor external to a corresponding internal security zone, wherein the requestor is a network function of an existing trusted business partner of the host operator, and wherein the incoming message constitutes control plane traffic between core network functions of different security levels inside or connected to the communication network operated by the host operator;
        extract identity information of the requestor based on the incoming message from a network transport layer and IP layer during security channel establishment, wherein the extracted identity information comprises node identity information, network function identity information, and slice information associated with the requestor;
        extract message attributes and message body information of the incoming message from a network application layer;
        validate each of the extracted identity information, message attributes, and incoming message body information, against each other, against threat intelligence analytics data, and a business policy stored at the security guard, wherein the business policy is an agreement between the requestor, and the host operator of the corresponding internal security zone, wherein the business policy includes a mapping of sensitive information elements and slice identifiers, and a mapping of slice identifiers and network functions, and wherein each security guard is configured to validate by matching of identity information with one of: information from messaging layer and identity elements, slice identity, and the mapping of slice and network functions;
        compute one or more risk scores indicating security threat levels for an associated internal security zone and incidence of an attack on the associated internal security zone, based on validated information; and
        enable one or more acts of modification of the incoming message or preventing delivery of one or more incoming messages or triggering additional network security measures, if at least one risk score exceeds a predetermined threshold.

2. The system as claimed in claim 1, wherein the extracted message attributes comprises a service request identifier, slice identities used in the message attributes, a slice related header information, and an access token from the service request identifier.

3. The system as claimed in claim 1, wherein each security guard is configured to extract the message body information by identification of sensitive information elements and their values, wherein the sensitive information elements comprises one or more of: user location related information, user identity, user group identity, user equipment identity, session identifiers, software identifiers and charging identifiers.

4. The system as claimed in claim 1, wherein each security guard is configured to validate by matching a service request identifier and an access token with sensitive information elements, the mapping of sensitive information elements and network functions, and slice and node information from the access token.

5. The system as claimed in claim 1, wherein the triggered additional network security measures comprises one or more of: raising a security alarm, forwarding the incoming message to a Security Information Centre, quarantining the incoming message, and forwarding the incoming message for further inspection, actions, correlation and threat analysis.

6. The system as claimed in claim 1, wherein each security guard is deployed between one of: a sliced network and an interconnection network, two network slices, shared and non-shared network functions, dedicated network functions and a shared infrastructure, and 5G network functions, and elements of legacy generations.

7. The system as claimed in claim 1, wherein each security guard is collocated with one of: a Network Resource Function (NRF), a Network Slice Selection Function (NSSF), a Service Communication Proxy (SCP), a Security Edge Protection Proxy (SEPP), Protocol interworking functions (IWFs) for legacy support, a Diameter Routing Agent (DRA) and a firewall.

8. The system as claimed in claim 1, wherein each security guard is one of: a virtualized instance and a physical network node.

9. The system as claimed in claim 1, wherein the communication network operated by the host operator is a fifth generation wireless mobile communication network.

10. A method for securing control plane traffic in a sliced communication network that is operated by a host operator and that is adapted to run a plurality of network functions and divided into a plurality of internal security zones, characterized in that, the method comprises the steps of:
    allocating a dedicated security guard for each internal security zone, wherein the internal security zone is formed by grouping one or more network functions; and
    configuring each dedicated security guard to:
        receive an incoming message from a requestor external to corresponding internal security zone, wherein the requestor is a network function of an existing trusted business partner of the host operator, and wherein the incoming message constitutes control plane traffic between core network functions of different security levels inside or connected to the communication network operated by the host operator;
        extract identity information of the requestor based on the incoming message from a network transport layer and IP layer during security channel establishment, wherein the extracted identity information comprises node identity information, network function identity information, and slice information associated with the requestor;
        extract message attributes of the incoming message from a network application layer;
        extract message body information of the incoming message from the network application layer;
        validate each of the extracted identity information, incoming message attributes, and/or incoming message body information, against each other, against threat intelligence analytics data, and a business policy stored at the dedicated security guard, wherein the business policy is an agreement between the requestor and the host operator of a corresponding internal security zone, wherein the business policy includes a mapping of sensitive information elements and slice identifiers, and a mapping of slice identifiers and network functions, and wherein each dedicated security guard is configured to validate by matching of identity information with one of: information from messaging layer and identity elements, slice identity, and the mapping of slice and network functions;
        compute one or more risk scores indicating security threat levels for an associated internal security zone and incidence of an attack on the associated internal security zone, based on validated identity information, message body information, and message attributes; and
        enable one or more acts of modification of one or more incoming messages or preventing delivery of one or more incoming messages, or triggering additional network security measures, if at least one risk score exceeds a predetermined threshold.

* * * * *